United States Patent Office 2,791,903
Patented May 14, 1957

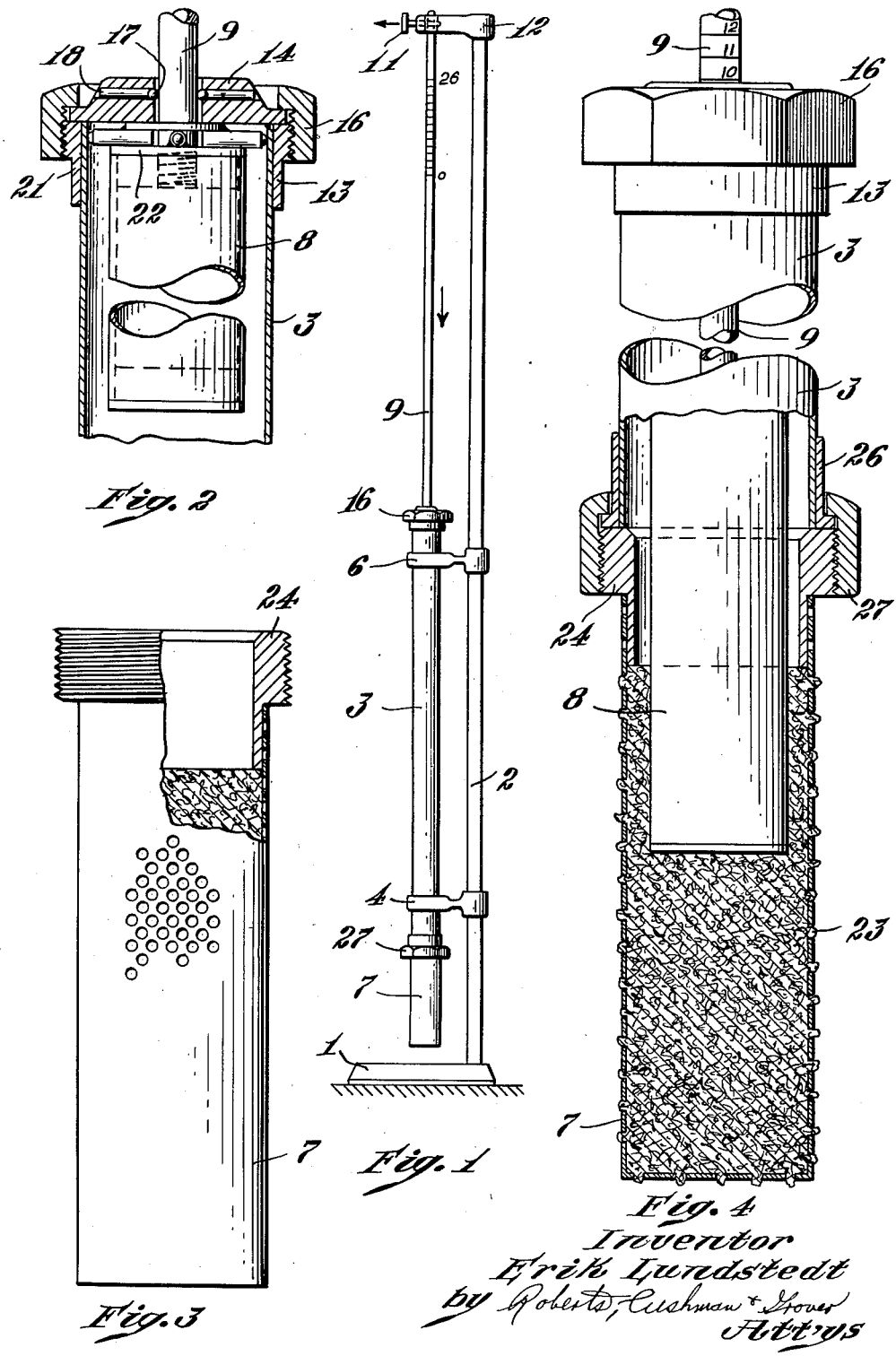

2,791,903

CHEESE CURD TESTING APPARATUS

Erik Lundstedt, Needham, Mass., assignor to H. P. Hood & Sons, Inc., Charlestown, Mass., a corporation of Massachusetts Application September 9, 1954, Serial No. 455,048

7 Claims. (Cl. 73—56)

This invention relates to the manufacture of cheese with curds obtained from coagulated milk and more particularly to the stage of cooking the coagulated milk before the curds are removed from the whey. To make cheese with uniformity throughout successive batches, the curds of the batches must have the same degree of firmness, not too soft and not hard or rubbery. Heretofore the curds have been tested by squeezing them in the hand and of course uniformity cannot be obtained in that way.

Objects of the present invention are to afford a test which is accurate and which can be made quickly and easily without long experience in cheese making so that the curds of successive batches may be cooked to the same optimum degree of firmness. Other objects are to provide testing apparatus which is simple and economical to manufacture, easy to use and clean, accurate in determining firmness and durable and reliable in use.

The invention involves apparatus comprising a container having perforations through its wall, togther with means for compressing the mass with a momentary impact sufficient to cause some of the mass to exude through the perforations and means to indicate the deformation of the mass by the impact. Preferably the container has an open end, an impact plunger, means to guide the plunger into the container through the open end, and means to cause the plunger to compress the mass with a momentary impact, the cross-sectional area of the plunger being at least approximately one-half that of the container and the wall of the container having perforations through which the mass exudes in response to the impact. The container is preferably tubular, one end being open and the other closed. The perforations may be in either the side wall or end wall but they are preferably in both walls.

In the preferred embodiment the apparatus comprises an elongate guide in which the plunger slides and means for detachably securing the container to the forward end of the guide, the cross-sectional area of the container being larger than that of the plunger so that the plunger may project from the guide into the container, thereby to compact the mass of curds in the container. While the plunger may be caused to impact the mass of curds in any suitable way it is preferably accomplished by arranging the guide vertically so that the plunger drops by gravity.

For the purpose of illustration a typical embodiment of the invention is illustrated in the accompanying drawings in which:

Fig. 1 is an elevation;

Fig. 2 is an axial section of the upper end of the plunger guide showing the plunger in upper position;

Fig. 3 is a side elevation of the perforated container with a part broken away to show the level to which the container is preferably loaded; and Fig. 4 is an enlarged side elevation with the container attached to the guide, with the lower end of the apparatus in axial section and with the plunger embedded in the mass of curds in the position it occupies at the end of its drop.

The particular embodiment of the invention chosen for the purpose of illustration comprises a base 1, carrying a post 2 on which the guide tube 3 is mounted by means of brackets 4 and 6. Detachably secured to the lower end of the tubular guide 3 is a perforate container 7. Sliding in the guide 3 is a plunger 8 having a stem 9 projecting from the upper end of the guide. The plunger may be held in upper position in any suitable way as for example by means of a detent 11 on bracket 12, the detent extending through an opening in the upper end of the stem 9. Thus the plunger may be dropped by retracting the detent 11 until it disengages the stem 9.

While any suitable means may be employed to guide the plunger in the tube 3, in the illustration a threaded collar 13 is secured to the upper end of the tube and a bearing ring 14 is secured over the end of the tube by means of a collar 16 threaded over the ring 13. To reduce the friction between the stem and bearing any suitable anti-friction devices may be employed. In the illustration ball bearings 17 are held in bearing position by means of plugs 18 in radial openings in the bearing ring 14. Likewise the plunger 8 is preferably guided in the tube 3 by an antifriction device and in the illustration this device also comprises ball bearings 21 mounted in radial openings in a disk 22 fast to the upper end of the plunger 8.

As shown in Figs. 3 and 4 the curd container comprises a tubular cup having perforations 23 in its side and bottom walls. Fast to the top of the container is a collar 24 adapted to set against a collar 26 fast to the bottom of the tube 3. The container is detachably held in position on the lower end of the tube 3 by means of a flanged collar 27 threaded over the collar 24, To test a batch of curds to determine when to stop the cooking process, enough curds are removed from the cooking vessel to fill the container 7 and, after being chilled to approximately 40° F., they are loaded into the container. While the container may be completely filled it is preferably filled only to the lower edge of the collar 24. In loading the container it is preferably shaken lightly to dispel the liquid between the curds and cause them to settle snugly together. After the container is filled it is secured to the bottom of the tube 3 as shown in Fig. 4 and the plunger 8 is dropped. The impact of the plunger on the mass of curds causes the mass to exude slightly through the perforations 23 as indicated in Fig. 4 and the firmness of the curds is indicated by the degree of penetration of the plunger into the mass, the plunger penetrating less with firm curds than with those which have not been cooked so much. As shown in Figs. 1 and 4 the stem 9 is calibrated to indicate the extent of penetration.

While the characteristics of the apparatus may differ for different kinds of cheese, in testing curds for cottage cheese they are preferably as follows. The perforations 23 are preferably about 0.15 inch in diameter and spaced about $3/_{16}$ inch between centers, thus making about 33 holes per square inch. While the diameter of the plunger 8 may be almost as great as that of the container 7, leaving only enough clearance to avoid frictional engagement therebetween, the minimum cross-sectional area of the plunger 8 should be at least approximately half that of the container 7. With the parts constructed and arranged as described the internal diameter of the container 7 may be 2 inches, its length 7 inches, the outside diameter of the plunger 8 may be 1½ inches, the weight of the plunger 1½ pounds, and the distance through which it drops before it strikes the mass of curds may be 30 inches, in which case the foot pounds with which the plunger impacts the mass is 3¾. With the aforesaid size of container the curds are shaken to a compactness such that a mass of curds sufficient to fill the container weighs 400 grams.

It should be understood that the present disclosure is for the purpose of illustration only and that this invention includes all modifications and equivalents which fall within the scope of the appended claims.

I claim:

1. For testing the firmness of a mass of cheese curds, apparatus comprising a container having perforations through its wall, a plunger for compressing the mass with a momentary impact sufficient to cause some of the mass to exude through said perforations, the cross-sectional size of the plunger relative to that of the container being large enough to cause displacement of the mass predominantly through said perforations, the plunger being movable from a retracted position, releasable means to hold the plunger in said position, and means to indicate the degree of penetration of the plunger into the mass.

2. For testing the firmness of a mass of cheese curds, apparatus comprising a container having an open end, an impact plunger, means to guide the plunger into the container through said open end, the plunger being movable from a retracted position to compress said mass with a momentary impact, releasable means to hold the plunger in said position, the cross-sectional area of the plunger being at least approximately one-half that of the container and the wall of the container having perforations through which the mass exudes in response to said impact, and means to indicate the degree of penetration of the plunger into the container.

3. For testing the firmness of a mass of cheese curds, apparatus comprising a tubular container having one end open and the other end closed, an impact plunger, means to guide the plunger into the container through said open end, the plunger being movable from a retracted position to compress said mass with a momentary impact, releasable means to hold the plunger in said position, the cross-sectional area of the plunger being at least approximately one-half that of the container and the wall of the container having perforations through which the mass exudes in response to said impact, and means to indicate the degree of penetration of the plunger into the container.

4. For testing the firmness of a mass of cheese curds, apparatus comprising an impact plunger, an elongate guide in which the plunger slides, a tubular container for the curds, means for detachably securing the container to the forward end of the guide, the cross-sectional area of the container being larger than that of the plunger so that the plunger may project from the guide into the container, the plunger being movable from a retracted position to compact said mass with a momentary impact, releasable means to hold the plunger in said position, the wall of the container having perforations through which the mass exudes in response to said impact, the cross-sectional size of the plunger relative to that of the container being large enough to cause displacement of the mass predominantly through said perforations, and means to indicate the degree of penetration of the plunger into the container.

5. For testing the firmness of a mass of cheese curds, apparatus comprising an impact plunger, a vertical guide in which the plunger slides, a tubular container for the curds, means for detachably securing the container to the lower end of the guide, the cross-sectional area of the container being larger than that of the plunger so that the plunger may drop into the container to compact said mass with a momentary impact, releasable means normally sustaining the plunger above the mass, the wall of the container having perforations through which the mass exudes in response to said impact, the cross-sectional size of the plunger relative to that of the container being large enough to cause displacement of the mass predominantly through said perforations, and means to indicate the degree of penetration of the plunger into the container.

6. For testing the firmness of a mass of cheese curds, apparatus comprising a curd container having perforations through its wall, a plunger for compressing the mass of curds in the container, means for causing the plunger to impact the mass with a predetermined force sufficient to exude some of the mass through said perforations, the cross-sectional size of the plunger relative to that of the container being large enough to cause displacement of the mass predominantly through said perforations, and means to indicate the degree of penetration of the plunger into the mass.

7. For testing the firmness of a mass of cheese curds, apparatus comprising a curd container having perforations through its wall, a plunger for compressing the mass of curds in the container, the cross-sectional size of the plunger being at least approximately one-half that of the container, means for causing the plunger to impact the mass with a predetermined force sufficient to exude some of the mass through said perforations, and means to indicate the degree of penetration of the plunger into the mass.

References Cited in the file of this patent

UNITED STATES PATENTS

| | | |
|---|---|---|
| 855,923 | Ballentine | June 4, 1907 |
| 989,822 | Strasburger | Apr. 18, 1911 |
| 1,470,806 | Burke | Oct. 16, 1923 |
| 1,651,596 | Hall | Dec. 6, 1927 |
| 1,748,512 | Knopf | Feb. 25, 1930 |
| 1,774,830 | Green | Sept. 2, 1930 |
| 2,045,548 | Dillon | June 23, 1936 |
| 2,175,173 | Batchelder | Oct. 10, 1939 |
| 2,437,194 | Harrington | Mar. 2, 1948 |

FOREIGN PATENTS

| | | |
|---|---|---|
| 577,578 | Germany | June 1, 1933 |